US010602548B2

(12) United States Patent
Trotta et al.

(10) Patent No.: US 10,602,548 B2
(45) Date of Patent: Mar. 24, 2020

(54) SYSTEM AND METHOD FOR GESTURE SENSING

(71) Applicant: Infineon Technologies AG, Neubiberg (DE)

(72) Inventors: Saverio Trotta, Munich (DE); Reinhard-Wolfgang Jungmaier, Aying (DE); Achim Dallmann, Baldham (DE)

(73) Assignee: INFINEON TECHNOLOGIES AG, Neubiberg (DE)

( * ) Notice: Subject to any disclaimer, the term of this patent is extended or adjusted under 35 U.S.C. 154(b) by 138 days.

(21) Appl. No.: 15/630,675

(22) Filed: Jun. 22, 2017

(65) Prior Publication Data

US 2018/0376509 A1    Dec. 27, 2018

(51) Int. Cl.
*G06F 3/01*     (2006.01)
*H04W 74/08*    (2009.01)
(Continued)

(52) U.S. Cl.
CPC ........ *H04W 74/0833* (2013.01); *G06F 3/017* (2013.01); *G06F 3/038* (2013.01); *H04B 10/114* (2013.01); *H04B 10/40* (2013.01)

(58) Field of Classification Search
CPC ..... G01S 7/00; G01S 7/03; G01S 7/41; G01S 7/032; G01S 7/415; G01S 13/00;
(Continued)

(56) References Cited

U.S. PATENT DOCUMENTS 4,241,347 A     12/1980  Albanese et al.
6,134,340 A *   10/2000  Hsu .................... G06K 9/00087
                                                              382/124
(Continued)

FOREIGN PATENT DOCUMENTS

CN     1463161 A    12/2003
CN     1716695 A     1/2006
(Continued)

OTHER PUBLICATIONS

Chen, Xiaolong et al., "Detection and Extraction of Marine Target with Micromotion via Short-Time Fractional Fourier Transform in Sparse Domain," IEEE International Conference on Signal Processing, Communications and Computing, ICSPCC, Aug. 5-8, 2016, 5 pages.

(Continued)

*Primary Examiner* — Shawkat M Ali
(74) *Attorney, Agent, or Firm* — Slater Matsil, LLP (57) ABSTRACT

In accordance with some embodiments, a method is provided. The method includes accessing a predefined numeric sequence at an application processor. The method further includes receiving, from a sensor of the sensor system, a verification sequence having a predetermined quantity of repetitions of the predefined numeric sequence. The method further includes correlating the verification sequence with the predefined numeric sequence. The method further includes counting a quantity of correlations between the predefined numeric sequence and the verification sequence. The method further includes adjusting a parameter of the sensor or the application processor in response to the predetermined quantity of repetitions not equaling the quantity of correlations.

23 Claims, 5 Drawing Sheets

(51) Int. Cl.
*G06F 3/038* (2013.01)
*H04B 10/114* (2013.01)
*H04B 10/40* (2013.01)

(58) Field of Classification Search
CPC .......... G01S 13/02; G01S 13/34; G01S 13/58;
G01S 13/66; G01S 13/86; G01S 13/89;
G01S 15/56; G06F 3/00; G06F 3/01;
G06F 3/03; G06F 3/017; G06F 3/038;
G06F 3/044; G06F 3/0325; G06F 3/0481;
G06F 3/0484; G06F 17/30; G06K 9/00;
H04B 10/40; H04B 10/114; H04W 74/08;
H04W 74/0833
USPC ................ 345/156; 375/130, 219, 295, 316;
707/748
See application file for complete search history.

(56) References Cited

U.S. PATENT DOCUMENTS

| | | | |
|---|---|---|---|
| 6,147,572 A | 11/2000 | Kaminski et al. | |
| 6,414,631 B1 | 7/2002 | Fujimoto | |
| 6,636,174 B2 | 10/2003 | Arikan et al. | |
| 7,048,973 B2 | 5/2006 | Sakamoto et al. | |
| 7,057,564 B2 | 6/2006 | Tsai et al. | |
| 7,171,052 B2 | 1/2007 | Park | |
| 7,197,168 B2 * | 3/2007 | Russo | G06K 9/00026 382/125 |
| 7,317,417 B2 | 1/2008 | Arikan et al. | |
| 7,596,241 B2 | 9/2009 | Rittscher et al. | |
| 7,692,574 B2 | 4/2010 | Nakagawa | |
| 7,873,326 B2 | 1/2011 | Sadr | |
| 7,889,147 B2 | 2/2011 | Tam et al. | |
| 8,228,382 B2 | 7/2012 | Pattikonda | |
| 8,497,805 B2 | 7/2013 | Rofougaran et al. | |
| 8,659,369 B2 | 2/2014 | Rofougaran et al. | |
| 8,731,502 B2 | 5/2014 | Salle et al. | |
| 8,811,723 B2 * | 8/2014 | Russo | G06F 3/033 382/157 |
| 8,836,596 B2 | 9/2014 | Richards et al. | |
| 8,847,814 B2 | 9/2014 | Himmelstoss et al. | |
| 8,860,532 B2 | 10/2014 | Gong et al. | |
| 8,976,061 B2 | 3/2015 | Chowdhury | |
| 9,172,132 B2 | 10/2015 | Kam et al. | |
| 9,202,105 B1 | 12/2015 | Wang et al. | |
| 9,413,079 B2 | 8/2016 | Kamgaing et al. | |
| 9,495,600 B2 | 11/2016 | Heu et al. | |
| 9,886,095 B2 | 2/2018 | Pothier | |
| 9,935,065 B1 | 4/2018 | Baheti et al. | |
| 2002/0007428 A1 | 1/2002 | Chilton | |
| 2003/0179127 A1 | 9/2003 | Wienand | |
| 2004/0238857 A1 | 12/2004 | Beroz et al. | |
| 2006/0001572 A1 | 1/2006 | Gaucher et al. | |
| 2006/0049995 A1 | 3/2006 | Imaoka et al. | |
| 2006/0067456 A1 | 3/2006 | Ku et al. | |
| 2007/0210959 A1 | 9/2007 | Herd et al. | |
| 2008/0106460 A1 | 5/2008 | Kurtz et al. | |
| 2008/0238759 A1 | 10/2008 | Carocari et al. | |
| 2008/0291115 A1 | 11/2008 | Doan et al. | |
| 2008/0308917 A1 | 12/2008 | Pressel et al. | |
| 2009/0073026 A1 | 3/2009 | Nakagawa | |
| 2009/0085815 A1 | 4/2009 | Jakab et al. | |
| 2009/0153428 A1 | 6/2009 | Rofougaran et al. | |
| 2009/0315761 A1 | 12/2009 | Walter et al. | |
| 2010/0207805 A1 | 8/2010 | Haworth | |
| 2011/0299433 A1 | 12/2011 | Darabi et al. | |
| 2012/0087230 A1 | 4/2012 | Guo et al. | |
| 2012/0092284 A1 | 4/2012 | Rofougaran et al. | |
| 2012/0116231 A1 | 5/2012 | Liao et al. | |
| 2012/0195161 A1 | 8/2012 | Little et al. | |
| 2012/0206339 A1 | 8/2012 | Dahl | |
| 2012/0280900 A1 | 11/2012 | Wang et al. | |
| 2013/0027240 A1 | 1/2013 | Chowdhury | |
| 2013/0106673 A1 | 5/2013 | McCormack et al. | |
| 2014/0028542 A1 | 1/2014 | Lovitt et al. | |
| 2014/0070994 A1 | 3/2014 | Schmalenberg et al. | |
| 2014/0145883 A1 | 5/2014 | Baks et al. | |
| 2014/0324888 A1 | 10/2014 | Xie et al. | |
| 2015/0181840 A1 | 7/2015 | Tupin, Jr. et al. | |
| 2015/0185316 A1 | 7/2015 | Rao et al. | |
| 2015/0212198 A1 | 7/2015 | Nishio et al. | |
| 2015/0243575 A1 | 8/2015 | Strothmann et al. | |
| 2015/0277569 A1 * | 10/2015 | Sprenger | G06F 3/017 345/156 |
| 2015/0325925 A1 | 11/2015 | Kamgaing et al. | |
| 2015/0346820 A1 | 12/2015 | Poupyrev et al. | |
| 2015/0348821 A1 | 12/2015 | Iwanaga et al. | |
| 2015/0364816 A1 | 12/2015 | Murugan et al. | |
| 2016/0018511 A1 | 1/2016 | Nayyar et al. | |
| 2016/0041617 A1 | 2/2016 | Poupyrev | |
| 2016/0041618 A1 | 2/2016 | Poupyrev | |
| 2016/0061942 A1 | 3/2016 | Rao et al. | |
| 2016/0061947 A1 | 3/2016 | Patole et al. | |
| 2016/0098089 A1 | 4/2016 | Poupyrev | |
| 2016/0103213 A1 | 4/2016 | Ikram et al. | |
| 2016/0109566 A1 | 4/2016 | Liu et al. | |
| 2016/0118353 A1 | 4/2016 | Ahrens et al. | |
| 2016/0146931 A1 | 5/2016 | Rao et al. | |
| 2016/0146933 A1 | 5/2016 | Rao et al. | |
| 2016/0178730 A1 | 6/2016 | Trotta et al. | |
| 2016/0187462 A1 | 6/2016 | Altus et al. | |
| 2016/0191232 A1 | 6/2016 | Subburaj et al. | |
| 2016/0240907 A1 | 8/2016 | Haroun | |
| 2016/0249133 A1 | 8/2016 | Sorensen | |
| 2016/0252607 A1 * | 9/2016 | Saboo | G01S 13/02 342/107 |
| 2016/0259037 A1 | 9/2016 | Molchanov et al. | |
| 2016/0266233 A1 | 9/2016 | Mansour | |
| 2016/0269815 A1 | 9/2016 | Liao et al. | |
| 2016/0291130 A1 | 10/2016 | Ginsburg et al. | |
| 2016/0299215 A1 | 10/2016 | Dandu et al. | |
| 2016/0306034 A1 | 10/2016 | Trotta et al. | |
| 2016/0320852 A1 * | 11/2016 | Poupyrev | G06F 3/0325 |
| 2016/0320853 A1 | 11/2016 | Lien et al. | |
| 2016/0327633 A1 | 11/2016 | Kumar Y.B. et al. | |
| 2016/0334502 A1 | 11/2016 | Ali et al. | |
| 2016/0349845 A1 * | 12/2016 | Poupyrev | G06F 3/016 |
| 2017/0033062 A1 | 2/2017 | Liu et al. | |
| 2017/0045607 A1 | 2/2017 | Bharadwaj et al. | |
| 2017/0052618 A1 | 2/2017 | Lee et al. | |
| 2017/0054449 A1 * | 2/2017 | Mani | H03M 7/4075 |
| 2017/0060254 A1 | 3/2017 | Molchanov et al. | |
| 2017/0070952 A1 | 3/2017 | Balakrishnan et al. | |
| 2017/0074974 A1 | 3/2017 | Rao et al. | |
| 2017/0074980 A1 | 3/2017 | Adib et al. | |
| 2017/0090014 A1 | 3/2017 | Subburaj et al. | |
| 2017/0090015 A1 | 3/2017 | Breen et al. | |
| 2017/0115377 A1 | 4/2017 | Giannini et al. | |
| 2017/0131395 A1 * | 5/2017 | Reynolds | G01S 7/415 |
| 2017/0139036 A1 | 5/2017 | Nayyar et al. | |
| 2017/0170947 A1 | 6/2017 | Yang | |
| 2017/0176574 A1 | 6/2017 | Eswaran et al. | |
| 2017/0192847 A1 | 7/2017 | Rao et al. | |
| 2017/0201019 A1 | 7/2017 | Trotta | |
| 2017/0212597 A1 | 7/2017 | Mishra | |
| 2017/0364160 A1 | 12/2017 | Malysa et al. | |
| 2018/0046255 A1 | 2/2018 | Rothera et al. | |
| 2018/0071473 A1 | 3/2018 | Trotta et al. | |
| 2018/0101239 A1 | 4/2018 | Yin et al. | |

FOREIGN PATENT DOCUMENTS

| | | |
|---|---|---|
| CN | 101490578 A | 7/2009 |
| CN | 101585361 A | 11/2009 |
| CN | 102788969 A | 11/2012 |
| CN | 102967854 A | 3/2013 |
| CN | 103529444 A | 1/2014 |
| CN | 203950036 U | 11/2014 |
| DE | 102008054570 A1 | 6/2010 |
| DE | 102011075725 A1 | 11/2012 |
| DE | 102014118063 A1 | 7/2015 |
| GB | 1288661 A | 9/1972 |
| GB | 2247799 A | 3/1992 |

(56) References Cited

FOREIGN PATENT DOCUMENTS

| | | |
|---|---|---|
| JP | 2001174539 A | 6/2001 |
| JP | 2004198312 A | 7/2004 |
| JP | 2006234513 A | 9/2006 |
| JP | 2008029025 A | 2/2008 |
| JP | 2008089614 A | 4/2008 |
| JP | 2009069124 A | 4/2009 |
| JP | 2011529181 A | 12/2011 |
| JP | 2012112861 A | 6/2012 |
| JP | 2013521508 A | 6/2013 |
| JP | 2014055957 A | 3/2014 |
| KR | 20090063166 A | 6/2009 |
| KR | 20140082815 A | 7/2014 |
| WO | 2007060069 A1 | 5/2007 |
| WO | 2013009473 A2 | 1/2013 |
| WO | 2016033361 A1 | 3/2016 |

OTHER PUBLICATIONS

Chuanhua, Du, "FMCW Radar Range-Doppler Processing and Beam Formation Technology," Chinese Doctoral Dissertations & Master's Theses Full Text Database (Masters)—Information Science and Technology Series, China National Knowledge Infrastructure, ISSN 1674-0246, CN 11-9144/G, Dec. 16, 2004-Mar. 2015, 14 pages.
Deacon, Peter et al., "Frequency Modulated Continuous Wave (FMCW) Radar," Design Team 6 Technical Lecture, Nov. 9, 2011, 27 pages.
Diederichs, Kailtyn et al., "Wireless Biometric Individual Identification Utilizing Millimeter Waves", IEEE Sensors Letters, vol. 1, No. 1, IEEE Sensors Council 3500104, Feb. 2017, 4 pages.
Dooring Alert Systems, "Riders Matter," http:\\dooringalertsystems.com, printed Oct. 4, 2017, 16 pages.
Filippelli, Mario et al., "Respiratory dynamics during laughter," J Appl Physiol, (90), 1441-1446, Apr. 2001, http://iap.physiology.org/content/jap/90/4/1441.full.pdf.
Fox, Ben, "The Simple Technique That Could Save Cyclists' Lives," https://www.outsideonline.com/2115116/simple-technique-could-save-cyclists-lives, Sep. 19, 2016, 6 pages.
Gu, Changzhan et al., "Assessment of Human Respiration Patterns via Noncontact Sensing Using Doppler Multi-Radar System", Sensors Mar. 2015, 15(3), 6383-6398, doi: 10.3390/s150306383, 17 pages.
Guercan, Yalin "Super-resolution Algorithms for Joint Range-Azimuth-Doppler Estimation in Automotive Radars," Technische Universitet Delft, TUDelft University of Technology Challenge the Future, Jan. 25, 2017, 72 pages.
Inac, Ozgur et al., "A Phased Array RFIC with Built-In Self-Test Capabilities," IEEE Transactions on Microwave Theory and Techniques, vol. 60, No. 1, Jan. 2012, 10 pages.
Kizhakkel, V., "Pulsed Radar Target Recognition Based on Micro-Doppler Signatures Using Wavelet Analysis", A Thesis, Graduate Program in Electrical and Computer Engineering, Ohio State University, Jan. 2013-May 2013, 118 pages.
Kuehnke, Lutz, "Phased Array Calibration Procedures Based on Measured Element Patterns," 2001 Eleventh International Conference on Antennas and Propagation, IEEE Conf., Publ. No. 480, Apr. 17-20, 2001, 4 pages.
Lim, Soo-Chul et al., "Expansion of Smartwatch Touch Interface from Touchscreen to Around Device Interface Using Infrared Line Image Sensors," Sensors 2015, ISSN 1424-8220, vol. 15, 16642-16653, doi:10.3390/s150716642, www.mdpi.com/journal/sensors, Jul. 15, 2009, 12 pages.
Lin, Jau-Jr et al., "Design of an FMCW radar baseband signal processing system for automotive application," SpringerPlus a SpringerOpen Journal, (2016) 5:42, http://creativecommons.org/licenses/by/4.0/, DOI 10.1186/s40064-015-1583-5; Jan. 2016, 16 pages.
Microwave Journal Frequency Mailers, "Single-Chip 24 GHz Radar Front End," Infineon Technologies AG, www.microwavejournal.com/articles/print/21553-single-chip-24-ghz-radar-front-end, Feb. 13, 2014, 2 pages.
Richards, Mark A., "Fundamentals of Radar Signal Processing," McGraw Hill Electronic Engineering, ISBN: 0-07-144474-2, Jun. 2005, 93 pages.
Schroff, Florian et al., "FaceNet: A Unified Embedding for Face Recognition and Clustering," CVF, CVPR2015, IEEE Computer Society Conference on Computer Vision and Pattern Recognition; Mar. 12, 2015, pp. 815-823.
Simon, W., et al., "Highly Integrated KA-Band Tx Frontend Module Including 8x8 Antenna Array," IMST GmbH, Germany, Asia Pacific Microwave Conference, Dec. 7-10, 2009, 63 pages.
Suleymanov, Suleyman, "Design and Implementation of an FMCW Radar Signal Processing Module for Automotive Applications," Master Thesis, University of Twente, Aug. 31, 2016, 61 pages.
Thayananthan, T. et al., "Intelligent target recognition using micro-Doppler radar signatures," Defence R&D Canada, Radar Sensor Technology III, Proc. of SPIE, vol. 7308, 730817, Dec. 9, 2009, 11 pages.
Thayaparan, T. et al., "Micro-Doppler Radar Signatures for Intelligent Target Recognition," Defence Research and Development Canada, Technical Memorandum, DRDC Ottawa TM 2004-170, Sep. 2004, 73 pages.
Wilder, Carol N., et al., "Respiratory patterns in infant cry," Canada Journal of Speech, Human Communication Winter, 1974-75, http://cjslpa.ca/files/1974_HumComm_Vol_01/No_03_2-60/Wilder_Baken_HumComm_1974.pdf, pp. 18-34.
Xin, Qin et al., "Signal Processing for Digital Beamforming FMCW SAR," Hindawi Publishing Corporation, Mathematical Problems in Engineering, vol. 2014, Article ID 859890, http://dx.doi.org/10.1155/2014/859890, 11 pages.

* cited by examiner

SYSTEM AND METHOD FOR GESTURE SENSING

TECHNICAL FIELD

The present invention relates generally to wearable devices, and, in particular embodiments, to a system and method for gesture sensing.

BACKGROUND

Radar-based gesture detection systems are input interfaces that may be used to directly control a device such as a computer, a smartphone, or a tablet computer, or to control a remote device such as a vehicle, an electronic system within a building, or a home appliance. For example, when the remote device is a car, gesture detection systems allow a human actor to control various operations of the car from outside the car. Gesture sensing may be used for many applications, such as automotive applications (e.g., keyless entry, media control, etc.), industrial applications (e.g., machine control), Internet of Things applications (e.g., kitchen appliances, HVAC controls, etc.) and the like. Users may interact with gesture detection systems by making one or more gestures with their hands Applications in the millimeter-wave (mm-wave) frequency band, such as the V-band, have gained significant interest in the past few years due to the rapid advancement in low cost semiconductor technologies. Among other applications, radar-based gesture detection systems may be implemented using mm-wave technology. The mm-wave spectrum may have wider available bandwidth, which may allow better range resolution in touchless user interaction applications.

SUMMARY

In accordance with an embodiment, a method for verifying a sensor system includes: accessing a predefined numeric sequence at an application processor; receiving, from a sensor of the sensor system, a verification sequence having a predetermined quantity of repetitions of the predefined numeric sequence; correlating the verification sequence with the predefined numeric sequence; counting a quantity of correlations between the predefined numeric sequence and the verification sequence; and adjusting a parameter of the sensor or the application processor in response to the predetermined quantity of repetitions not equaling the quantity of correlations.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

A system and method for verifying operation of a gesture sensing system is disclosed, according to some embodiments. In particular, a gesture sensing device includes RF/baseband circuitry for performing gesture recognition, and, among other digital components, includes a random number generator that is used for verifying operation of the gesture sensing device. The random number generator produces a predetermined, random or pseudo-random numeric sequence. The random numeric sequence is generated with, e.g., a linear feedback shift register. Unlike samples from the gesture sensing device, the random numeric sequence is a deterministic signal, known a priori. Verification includes generating a pseudo-random numeric sequence in the gesture sensor device, and then transferring it to an application processor coupled to the gesture sensing device for validation. The application processor coupled to the gesture sensing device receives the random numeric sequence and determines whether the received pseudo-random numeric sequence matches a predetermined sequence. In various embodiments, the signal path over which the pseudo-random sequence propagates uses the same hardware, firmware, and software pipeline (e.g., data transfer pipeline) that is used for receiving sensor samples from the gesture sensing device. Among other things, verification of the data transfer pipeline may include checking for proper operation of the hardware devices, checking for proper operation of firmware and/or software executing on the devices, and checking physical connections between the devices. In some embodiments, a copy of the random numeric sequence is stored at the application processor, and the application processor compares the received sequence to the stored sequence. A match of the numeric sequences indicates integrity of the data transfer pipeline, and a mismatch may indicate that some portions of the data transfer pipeline are negatively affecting data transfer. Transmitting a known sequence allows information to be determined about the data transfer pipeline, as compared to checking individual sensor samples—which are not predefined values—during ordinary operation. Verification of the data transfer pipeline may occur during a startup or a verification sequence, and the verification indicates that the sensor samples transferred to the application processor are the expected values. One or more parameters of the data transfer pipeline may be adjusted in response to a verification failure.

Figure 1:
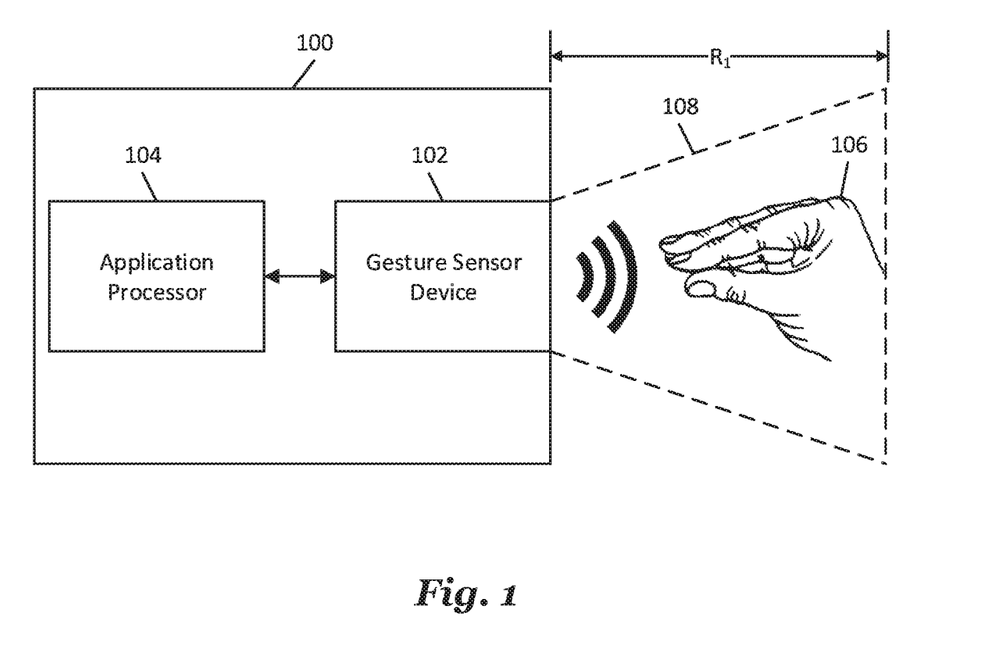
FIG. 1 is a system diagram of a gesture detection system.

FIG. 1 is a system diagram of a gesture detection system 100, which may be partially or wholly implemented as a user device. Users may interact with the device through a touchless interface because the device may be difficult to physically interact with. For example, the device may be a device with a small touchscreen and/or no buttons. Examples of such devices include internet of things (IoT) devices such as sensors; wearable devices such as a smart watch or a fitness device; and/or user devices such as smart phones or tablets.

The gesture detection system 100 has two components: a gesture sensor device 102, and an application processor 104 (both of which will be described further below). During operation, position and gestures of a target 106 may be detected by the gesture detection system 100. For example, a gesture of two fingers tapping each other could be interpreted as a "button press," or a gesture of a rotating thumb and finger may be interpreted as a turning a dial. The target 106 may be, e.g., a hand, a body, or the like. The gesture sensor device 102 has a field of view 108 that features a maximum detection range $R_1$. A gesture that is made within the field of view 108 is detectable by the gesture sensor device 102. In some embodiments, the gesture detection system 100 is a mm-wave gesture sensing system that is implemented as a frequency modulated continuous wave (FMCW) radar sensor having multiple transmit and receive channels to realize a digital beamforming holographic radar, such that a relative speed, distance, and phase of the target 106 in the field of view 108 is measured. The gesture sensor device 102 and the application processor 104 may be separate devices, or may be different component of a same device. In an embodiment, the gesture sensor device 102 and the application processor 104 are fabricated as part of the same integrated ciruict (IC) die, or are formed on the same semiconductor substrate.

The gesture sensor device 102 transmits and receives near-field radio signals for detecting the target 106 in 3D space. The gesture sensor device 102 transmits an incident RF signal (sometimes called a "chirp"), and receives a RF signal that is a reflection of the incident RF signal (sometimes called an "echo") from the target 106. Beat frequencies are determined from the incident RF signals and the reflected RF signals. The beat frequency signals may be used to determined information such as the location, speed, angle, etc., of the target 106 in 3D space.

The application processor 104 acquires the beat frequency signals and performs one or more signal processing steps to evaluate them. In an embodiment, the application processor 104 acquires a baseband signal that represents the beat frequency signals via an analog-to-digital converter (ADC) in the gesture sensor device 102. The signal processing steps may include performing a fast Fourier transform (FFT), a short-time Fourier transform (STFT), target classification, machine learning, and the like. Results of the signal processing steps are used to determine and perform an action on the device. Further details about near-field gesture recognition have been described in U.S. patent application Ser. No. 14/954,198. titled "RF System with an RFIC and Antenna System," which is hereby incorporated herein by reference. An action may be performed on the user device according to the results of evaluating the beat frequency signals. In some embodiments, the results may be used as UI input. For example, when tracking fine finger movement, the direction and rate of fine finger movement may determine the direction and rate of document scrolling in the UI. In some embodiments, the results are used to open an application on the user device.

Figure 2:
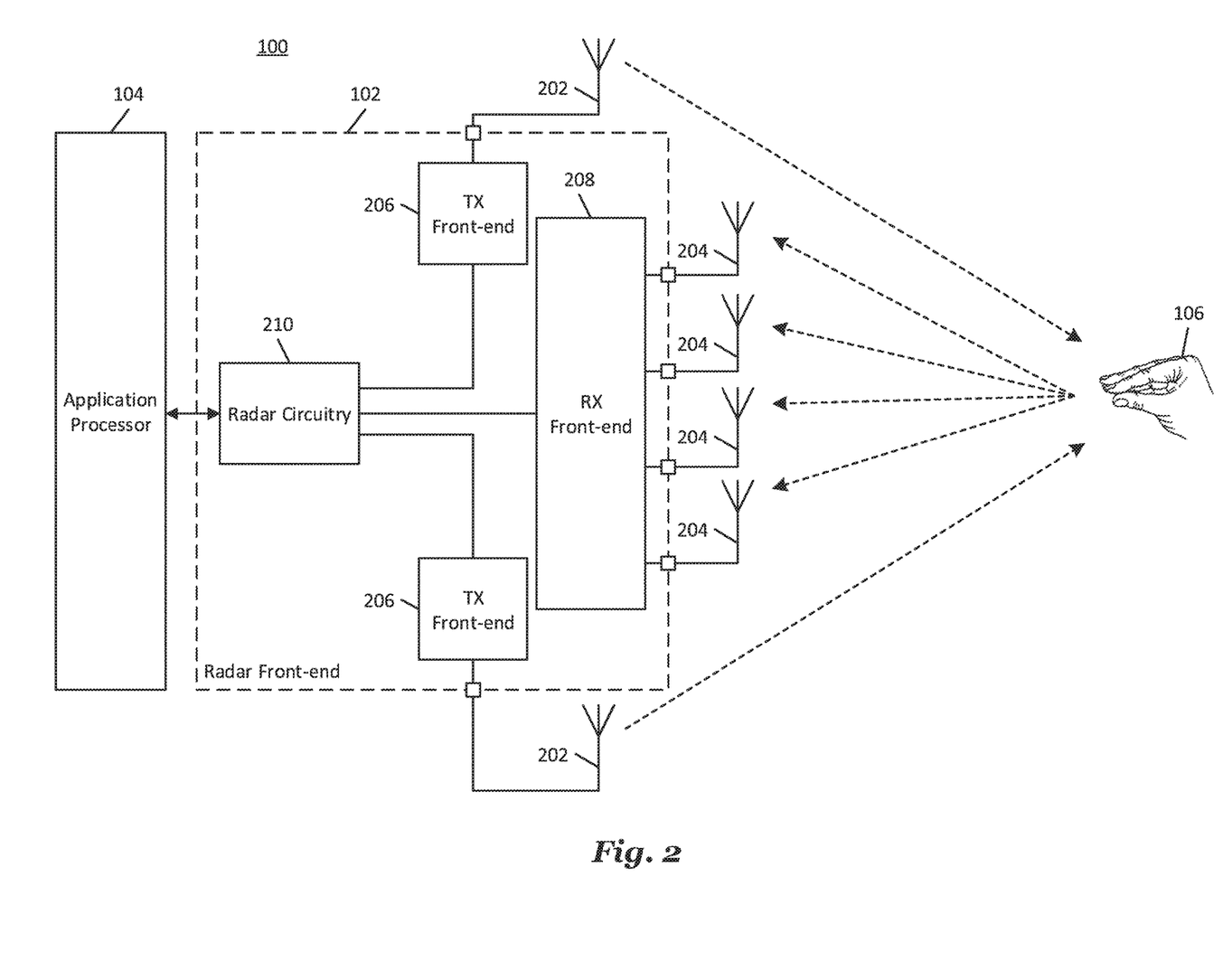
FIG. 2 is a schematic diagram of RF components of the gesture detection system.

FIG. 2 is a schematic diagram of RF components of the gesture detection system 100. As shown, the gesture sensor device 102 is configured to transmit incident RF signals toward the target 106 via transmit antennas 202, and receive reflected RF signals from the target 106 via receive antennas 204. The gesture sensor device 102 includes transmitter front-ends 206 coupled to the transmit antennas 202, and receiver front-ends 208 coupled to the receive antennas 204.

The transmitter front-ends 206 perform transmission of the incident RF signals toward the target 106. The transmitter front-ends 206 include filters, modulators, and the like for transmitting the incident RF signals. Although two of the transmitter front-ends 206 are illustrated and described, it should be appreciated that the gesture sensor device 102 may have several transmitter front-ends 206.

The receiver front-ends 208 receive and process the reflected RF signals from the target 106. The receiver front-ends 208 include baseband filters, demodulators, variable gain amplifiers (VGAs), and the like for receiving the reflected RF signals. Although one of the receiver front-ends 208 is illustrated and described, it should be appreciated that the gesture sensor device 102 may have several receiver front-ends 208.

During operation, the transmitter front-ends 206 transmit the incident RF signals, and the receiver front-ends 208 receive the reflected RF signals. Transmission and reception may be controlled by radar circuitry 210. The received reflected RF signals are filtered, amplified, and converted with devices integrated in the pipelines of the receiver front-ends 208. In particular, the received signals are down-converted from the original signal frequency to a baseband signal that represents the lower beat frequency signals. The baseband signal is then provided to the application processor 104 to determine information about the target 106.

Although illustrated as individual antennas, it should be appreciated that the transmit antennas 202 and/or the receive antennas 204 may be part of an array of antennas. Further, the transmit antennas 202 and the receive antennas 204 may be separate arrays of antennas, or may be a same array of antennas. In embodiments where a same array of antennas is used for both transmission and reception, the antennas in the array may be coupled to both the transmitter front-ends 206 and the receiver front-ends 208 with coupling structures (not shown). The coupling structures may be implemented using a passive structure, such as a rat-race coupler, a Wilkinson power divider, a circulator, or the like, or a switch. Further details about the design and operation of the transmit antennas 202 and the receive antennas 204 have been described in U.S. patent application Ser. No. 15/231,544, titled "Radio Frequency System and Method for Wearable Device," which is hereby incorporated herein by reference, and so details about their operation will not be repeated herein.

In some embodiments, some or all portions of the RF components of the gesture sensor device 102 may be implemented in a package that contains the transmit antennas 202, the receive antennas 204, the transmitter front-ends 206, the receiver front-ends 208, and/or the radar circuitry 210. In some embodiments, the gesture sensor device 102 may be implemented as one or more integrated circuits disposed on a circuit board, and the transmit antennas 202 and the receive antennas 204 may be implemented on the circuit board adjacent to the integrated circuits. In some embodiments, the transmitter front-ends 206, the receiver front-ends 208, and the radar circuitry 210 are formed on a same radar front-end IC die. The transmit antennas 202 and the receive antennas 204 may be part of the radar front-end IC die, or may be separate antennas over or adjacent to the radar front-end IC die. The radar front-end IC die may further include conductive layers, such as redistribution layers (RDLs), used for routing and/or for the implementation of various passive or active devices of the gesture sensor device 102. In an embodiment, the transmit antennas 202 and the receive antennas 204 may be implemented using the RDLs of the radar front-end IC die.

Figure 3:
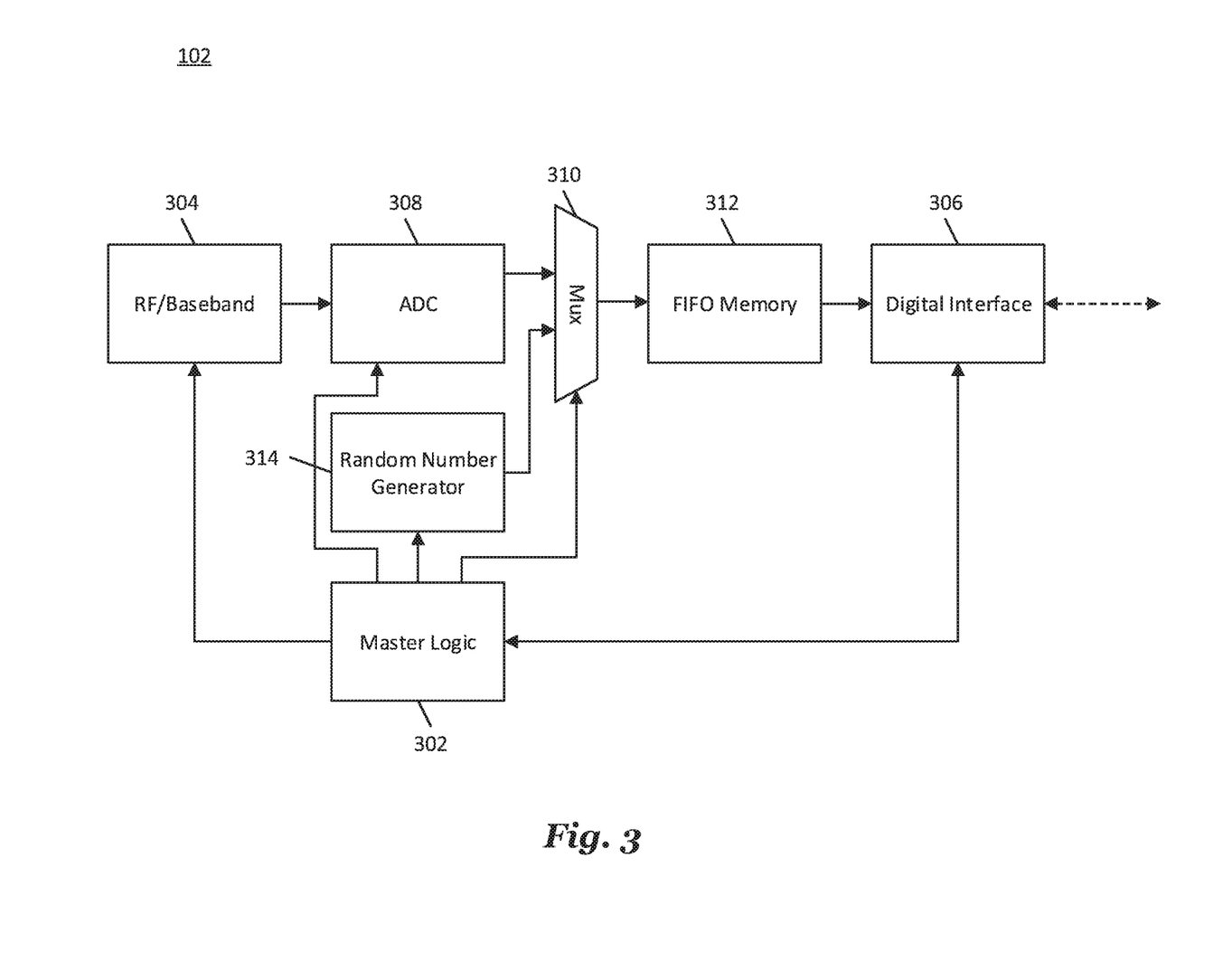
FIG. 3 is a block diagram of processing components of a gesture sensor device.

FIG. 3 is a block diagram of processing components of the gesture sensor device 102. The gesture sensor device 102 is a highly integrated device such as an application-specific integrated circuit (ASIC) that incorporates devices for transmitting the RF signal, receiving the reflected RF signals, filtering the received signals, and converting them to a digital format. Some or all of the devices in the gesture sensor device 102 may be formed as part of a same radar front-end IC die. During operation, the gesture sensor device 102 outputs digital sensor samples that are read by the application processor 104. The digital sensor samples represent baseband signals corresponding to the lower beat frequency signals detected by the gesture sensor device 102, and are ready to be processed by the application processor 104. Because the gesture sensor device 102 has integrated functionality for evaluating the reflected RF signals, the digital sensor samples produced by it may be ready to be processed or evaluated by an application processor. The gesture sensor device 102 includes a master logic unit 302, an RF/baseband device 304, a digital interface 306, ADCs 308, a multiplexer 310, first-in-first-out (FIFO) memory 312, and a random number generator 314, the combination of which may partially or wholly embody functionality of the radar circuitry 210.

The master logic unit 302 is the main processing pipeline for the gesture sensor device 102. It includes function units and/or circuitry for performing start-up sequences, calibrating and controlling the gesture sensor device 102, reading RF signals from the target 106, and producing sensor samples. In some embodiments, the master logic unit 302 is a finite state machine. In some embodiments, the master logic unit 302 may be a MCU or a microcontroller.

The RF/baseband device 304 includes the transmit antennas 202, the receive antennas 204, the transmitter front-ends 206, the receiver front-ends 208, and radar circuitry 210. The RF/baseband device 304 may be the radar front-end IC die (discussed above). Although it is shown as a single block in FIG. 3 for simplicity of illustration, it should be appreciated that the RF/baseband device 304 may include many devices, and may be on a same IC with other devices shown in FIG. 3. The master logic unit 302 controls the RF/baseband device 304 to switch it on and off.

The digital interface 306 outputs readings for the gesture sensor device 102, and provides a digital interface for outside devices to interact with the gesture sensor device 102. The target data from the gesture sensor device 102 is sent over the digital interface 306 to be read by, e.g., the application processor 104. The digital interface 306 may be a serial interface such as an serial peripheral interface (SPI) bus or an inter-integrated circuit (I²C) interface. The digital interface 306 may implement a standardized interface so that a generic driver or firmware may be used by the application processor 104 to access the digital sensor samples. Operating parameters for the gesture sensor device 102 may also be received over the digital interface 306. Operating parameters may include a clock rate for the digital interface 306, a sample buffering level, an interface configuration for the digital interface 306, and the like.

The ADCs 308 convert the baseband signal from the RF/baseband device 304 to digital samples. The digital sensor samples correspond to the lower beat frequency signals, and are a time-domain representation of the signal reflections received by the receiver front-ends 208 after being mixed down to the baseband with baseband filters. In some embodiments, the RF/baseband device 304 has several channels. For example, FIG. 2 shows an RF/baseband device with two transmit channels and four receive channels. There may be an ADC for each receive channel of the RF/baseband device 304. The ADC 308 for each receive channel may add a prefix to the samples after conversion. The prefix identifies the receive channel of the RF/baseband device 304 that produced the samples. The sampling rate of the ADCs 308 is controlled by the master logic unit 302, and the ADCs 308 may start or stop acquisition of samples in response to a trigger signal from the master logic unit 302 and/or the application processor 104.

The multiplexer 310 is coupled to the ADCs 308, and is used to select one of the receive channels. Samples from the ADC 308 of the selected receive channel are queued to be sent over the digital interface 306 by routing the outputs of the selected ADC 308 to the FIFO memory 312. At least one of the inputs of the multiplexer 310 is also coupled to the output of a random number generator 314 (discussed below) so that the values from the random number generator 314 may be sent over the digital interface 306. The master logic unit 302 may control the selected channel of the multiplexer 310.

The FIFO memory 312 stores sensor values from the selected ADC 308, and may be used to buffer the sensor readings. Values in the FIFO memory 312 may be used by the master logic unit 302, or may be output on the digital interface 306, to be read by the application processor 104. The FIFO memory 312 may be implemented, for example, by using a memory having a circular queue in which a read pointer and a write pointer are successively incremented to implement a FIFO function. Alternatively, the FIFO memory 312 may be implemented using a chain of cascaded registers. Alternatively, other memory types besides FIFO memory could be used in place of the FIFO memory 312, for example, other volatile or non-volatile storage elements. In embodiments where the memory is a volatile storage element, it may be, e.g., dual-port memory or single-port/multi-page memory with arbitration logic, and may be implemented as, e.g., SRAM, DRAM, or the like. The digital interface 306 may be an interface such as SPI that is relatively slow compared to sampling speed of the RF/baseband device 304 and the ADCs 308. As such, the digital interface 306 may output values slower than they are sampled by the ADCs 308. The FIFO memory 312 may have a relatively long queue that buffers the sensor samples. In an embodiment, the FIFO memory 312 has a length of about 196608 bits. In other embodiments, the FIFO memory 312 may have any length.

The random number generator 314 is a random or pseudo-random bit generator. The random number generator 314 produces a numeric sequence that is random, yet deterministic, and is known a priori. The random numeric sequence is periodic. The random number generator 314 may be implemented in several manners. In an embodiment, the random number generator 314 is linear feedback shift register (LFSR). The LFSR may have any number of bits, and in an embodiment has 11 or 12 bits. The random number generator 314 may produce a maximum length sequence (MLS), sometimes referred to as an M-sequence, and may have a primitive polynomial as its characteristic polynomial. For example, an LFSR with taps at the $9^{th}$ and $11^{th}$ bit may produce an M-sequence. The random number generator 314 may add a prefix to the values of the random numeric sequence, identifying the random number generator 314 as producing the numbers.

The random number generator 314 may have a length proportional to the size of the FIFO memory 312. In particular, the length of the random numeric sequence may be a multiple of the length of the FIFO memory 312. In an embodiment, the FIFO memory 312 has a length that is 96 times the period of the random numeric sequence. As such, 96 copies of the random numeric sequence may be stored in the FIFO memory 312.

As discussed above, the data transfer pipeline of the gesture sensor device 102 may be verified during a verification sequence or a startup sequence. In embodiments where the master logic unit 302 is a finite state machine, the verification or startup sequence may be a state of the finite state machine. Verification includes generating the random numeric sequence in the gesture sensor device 102, and then transferring it to the application processor 104 for validation. Among other things, verification of the data transfer pipeline may include checking for proper operation of: the random number generator 314; the multiplexer 310; the FIFO memory 312; the digital interface 306; the master logic unit 302; any firmware that may be executing on the gesture sensor device 102; physical connections between the gesture sensor device 102 and the application processor 104; any firmware or drivers that may be executing on the application processor 104; user-level software executing on the application processor 104; and the like. In other words, as used herein, the term "data transfer pipeline" includes hardware, firmware, and software aspects of the gesture detection system 100 that are used to transfer sensor samples from the gesture sensor device 102 to the application processor 104. Corruption of the sensor samples may occur at several possible point along the data transfer pipeline. Verification may ensure that the sensor samples received by the application processor 104 are correct and are not corrupted. Transmitting a known sequence allows information to be determined about the status and contents of the FIFO memory 312, as compared to checking individual sensor samples—which are not predefined values—during ordinary operation.

During verification of the data transfer pipeline, the master logic unit 302 set the multiplexer 310 so that the ADCs 308 are deselected and the random number generator 314 is instead selected. The setting of the multiplexer 310 may be performed in response to a command received over the digital interface 306, such as from the application processor 104. The RF/baseband device 304 and/or the ADCs 308 may also be turned off when the command is received. The random number generator 314 may be enabled such that it begins filling the FIFO memory 312 with the random numeric sequence. The digital interface 306 transfers the contents of the FIFO memory 312 to the application processor 104, which verifies the numeric sequence. Because the random number generator 314 is located at an early stage of the data transfer pipeline (e.g., before the multiplexer 310), most or all of the data transfer pipeline may be verified by the application processor 104.

Figure 4:
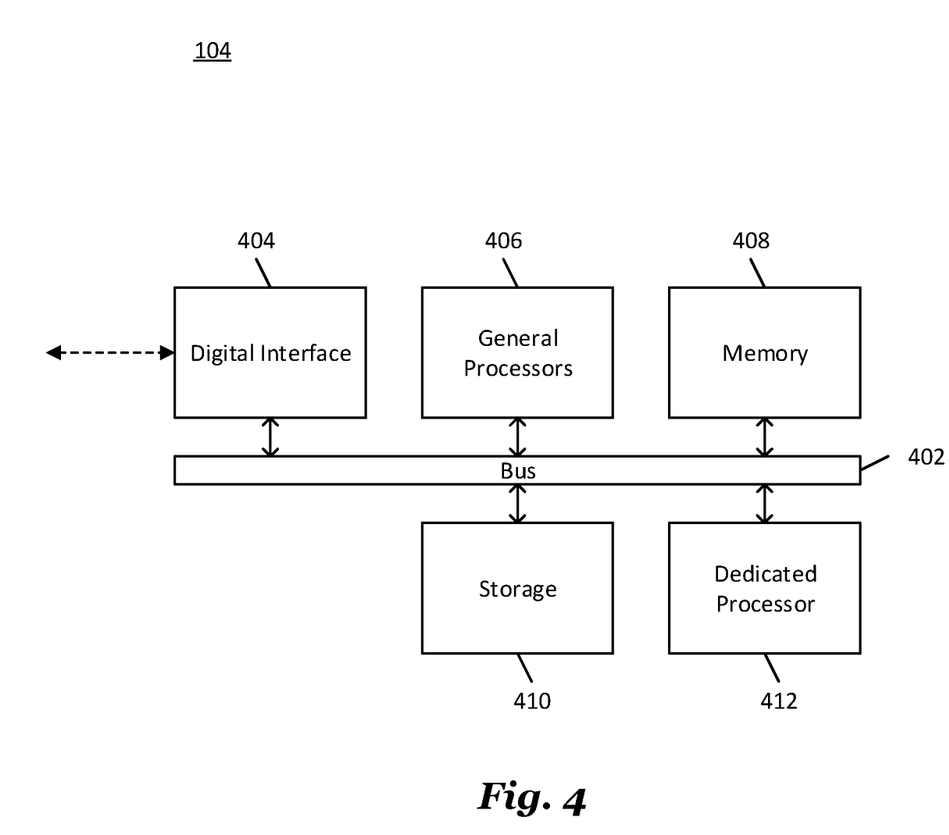
FIG. 4 is a block diagram of processing components of an application processor.

FIG. 4 is a block diagram of processing components of the application processor 104. The application processor 104 may be a system-on-chip such as a master control unit (MCU), a microcontroller, or the like. For example, the system-on-chip may be implemented using an ARM Cortex device. Alternatively, the application processor 104 may include a separate processor, memory, etc. Although devices of the application processor 104 are shown as separate blocks, it should be appreciated that some or all of the devices may be included with a same integrated circuit die or on a same semiconductor substrate. The application processor 104 includes a bus 402, which may (or may not) interconnect a digital interface 404, a general purpose processor 406, storage 408, memory 410, and a dedicated processor 412.

The digital interface 404 communicates with, among other things, the digital interface 306 of the gesture sensor device 102. The digital interface 404 may be similar to the digital interface 306. For example, they may both be SPI devices that are communicatively coupled on an SPI bus.

The general purpose processor 406 is used to execute software for operating or controlling the application processor 104. The general purpose processor 406 may be configured to process the sensor samples from the gesture sensor device 102 to determine information about the target 106. The general purpose processor 406 may also be configured to control aspects of the gesture sensor device 102, such as the transmissions produced by the gesture sensor device 102, and may also select the operating mode of the gesture sensor device 102. In particular, the general purpose processor 406 may be configured to switch the gesture sensor device 102 to the verification sequence via the digital interface 404.

The storage 408 stores a copy of the random numeric sequence, which is known a priori. In some embodiments, the storage 408 is a non-volatile storage such as non-volatile memory (NVRAM), electrically erasable programmable read-only memory (EEPROM), or the like, and the random numeric sequence is stored on the non-volatile storage. In some embodiments, the random numeric sequence is not stored as numeric values, but rather the storage 408 has instructions for generating the random numeric sequence. For example, the storage 408 may be a random number generator similar to the random number generator 314 that generates the random numeric sequence, or may store software for generating the random numeric sequence.

The memory 410 may be volatile memory that is used to execute software for operating or controlling the application processor 104. The memory 410 may store the numeric sequence transferred from the gesture sensor device 102 over the digital interfaces 306 and 404. In some embodiments, the values received from the gesture sensor device 102 during the verification sequence are stored in a special or reserved portion or block of the memory 410. The special or reserved portion of memory may be on a same memory module as that used by the rest of the application processor 104, or may be on a different memory module.

The dedicated processor 412 is an embedded processing element for evaluating the sensor samples or numeric sequence from the gesture sensor device 102. In an embodiment, the dedicated processor 412 is a different architecture or a different type of processor than the general purpose processor 406. In an embodiment, the dedicated processor 412 is a digital signal processor (DSP). The dedicated processor 412 may perform some of the signal processing steps for evaluating the sensor samples to determine information about the target 106, or for verifying operation of the gesture sensor device 102. The dedicated processor 412 may share the memory 410, or may have its own dedicate memory.

When verifying the data transfer pipeline, the contents of the FIFO memory 312 are transferred over the digital interface 306 to the application processor 104. The application processor 104 compares the received numeric sequence to the numeric sequence stored in the storage 408. If the received numeric sequence matches the stored numeric sequence, then the data transfer pipeline is verified and may be considered reliable. The comparison may be performed by the general purpose processor 406 and/or the dedicated processor 412, and may be accomplished using a variety of techniques. In an embodiment, the application processor 104 performs an autocorrelation with the stored numeric sequence and the received numeric sequence. When the length of the random numeric sequence is a multiple of the length of the FIFO memory 312, the autocorrelation function result should have a quantity of peaks that is equal to the multiple. Continuing the above example, when 96 copies of the random numeric sequence are stored in the FIFO memory 312, an autocorrelation result with 96 peaks indicates the data transfer pipeline is reliable. The application processor 104 may store an indication of the expected quantity of autocorrelation peaks.

Verification may also include checking the prefix of the values of the random numeric sequence. As noted above, the random number generator 314 and the ADCs 308 may add a prefix. Checking the prefix may allow the application processor to confirm that the prefix is being properly assigned and transmitted.

In some embodiments, verification may be performed by user-level software on the application processor 104. Verifying with user-level software may also allow confirmation that sensor samples are being transferred from the firmware or drivers of the application processor 104 to the user-level software without errors.

After successful verification, the application processor 104 may switch the gesture sensor device 102 to a normal operating mode. In some embodiments, operating parameters of the gesture sensor device 102 may be changed in response to a successful or a failed verification. If the result of the autocorrelation contained fewer peaks than expected, different parameters may be adjusted to determine where along the data transfer pipeline the numeric sequence was corrupted. For example, parameters for the FIFO memory 312 may be adjusted, or parameters for the digital interfaces 306 and 404 such as the maximum SPI clock speed may be evaluated or adjusted. The verification sequence may be performed again. Further adjustments may be made until verification passes. Likewise, if verification initially passes, the quantity or speed of the SPI channels may be increased until it fails, to determine a higher rate that may be used.

Figure 5:
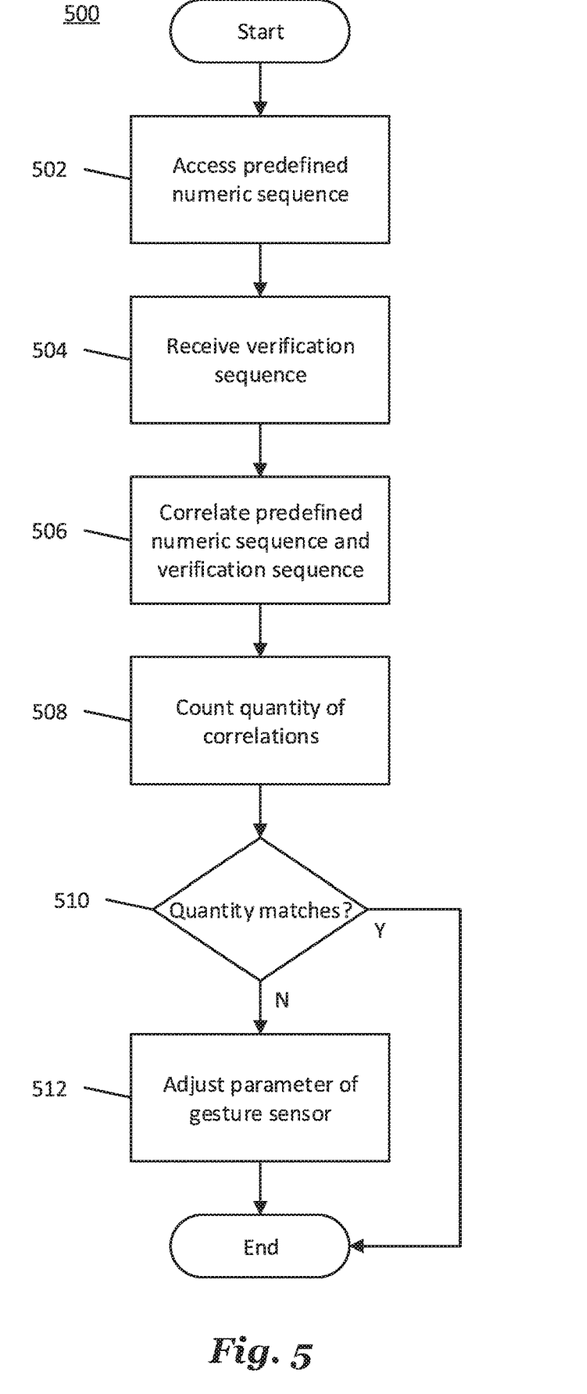
FIG. 5 is a flow diagram of a method for verifying a gesture sensor.

FIG. 5 is a flow diagram of a method 500 for verifying a gesture sensor. The method 500 may be indicative of operations occurring on the application processor 104 when verifying the gesture sensor device 102.

The application processor accesses a predefined numeric sequence (step 502). The predefined numeric sequence may be the random numeric sequence stored at the storage 408. A verification sequence is received from the gesture sensor device 102 (step 504). The verification sequence is a periodic sequence that has a predetermined quantity of repetitions of the random numeric sequence. An expected quantity of repetitions of the random numeric sequence may be stored at the application processor 104. The predefined numeric sequence is correlated with the verification sequence (step 506). The correlation may be performed with an autocorrelation function. The quantity of times the predefined numeric sequence correlates with the verification sequence is counted (step 508). Each correlation may be indicated with a peak in the result of the autocorrelation function. If the quantity of peaks in the autocorrelation function result matches the expected quantity (step 510), the method 500 concludes. Otherwise, a parameter of the gesture sensor is adjusted in response to the predetermined quantity of repetitions not equaling the quantity of times the predefined numeric sequence correlates with the verification sequence (step 512).

Embodiments may achieve advantages. Verifying the data transfer pipeline may allow the clock speed or quantity of channels of the digital interfaces to be optimized or at least improved, allowing for sufficiently fast yet reliable transfer of the sensor samples, which may be numerous depending on the quantity of RF chirps transmitted to the target. Because firmware of the application processor may configure the gesture sensor device before use, verification allows the firmware configuration to be validated. Delay or jitter of the digital interfaces may be measured.

In accordance with an embodiment, a method for verifying a sensor system includes: accessing a predefined numeric sequence at an application processor; receiving, from a sensor of the sensor system, a verification sequence having a predetermined quantity of repetitions of the predefined numeric sequence; correlating the verification sequence with the predefined numeric sequence; counting a quantity of correlations between the predefined numeric sequence and the verification sequence; and adjusting a parameter of the sensor or the application processor in response to the predetermined quantity of repetitions not equaling the quantity of correlations.

In some embodiments, the correlating the verification sequence with the predefined numeric sequence includes correlating the verification sequence and the predefined numeric sequence with an autocorrelation function. In some embodiments, the counting the quantity of correlations includes counting a quantity of peaks produced by the autocorrelation function. In some embodiments, the verification sequence is received from the sensor over a serial peripheral interface (SPI) bus. In some embodiments, the adjusting the parameter of the sensor or the application processor includes adjusting a SPI bus parameter of the sensor. In some embodiments, the adjusting the parameter of the sensor or the application processor includes adjusting a SPI bus parameter of the application processor.

In accordance with an embodiment, a sensor system includes: a sensor configured to produce a predefined numeric sequence, and to transmit a predetermined quantity of repetitions of the predefined numeric sequence over a digital interface; and an application processor coupled to the sensor, the application processor configured to receive the repetitions of the predefined numeric sequence over the digital interface, to access a copy of the predefined numeric sequence, and to correlate the copy of the predefined numeric sequence with the repetitions of the predefined numeric sequence.

In some embodiments, the sensor includes RF devices configured to transmit incident RF signals to a target, and receive reflected RF signals from the target indicating information about a gesture of the target in three-dimensional space. In some embodiments, the application processor is configured to adjust a parameter of the digital interface in response to the copy of the predefined numeric sequence not correlating with the repetitions of the predefined numeric sequence. In some embodiments, the sensor and the application processor are part of the same integrated circuit die.

In accordance with an embodiment, a gesture sensor device includes: a random number generator configured to produce a random numeric sequence; a first-in-first-out (FIFO) memory, the FIFO memory configured to store a predefined quantity of repetitions of the random numeric sequence; a digital interface coupled to the FIFO memory, the digital interface configured to transmit the repetitions of the random numeric sequence stored in the FIFO memory to an application processor; and a master logic unit configured to store the random numeric sequence from the random number generator to the FIFO memory in response to a verification command from the application processor.

In some embodiments, the gesture sensor device further includes: RF devices configured to transmit incident RF signals to a target, and receive reflected RF signals from the target indicating information about a gesture of the target in three-dimensional space; and analog-to-digital converters (ADCs) coupled to the RF devices, the ADCs converting the information about the gesture to sensor samples. In some embodiments, the master logic unit is further configured to turn-off the RF devices in response to receiving the verification command from the application processor. In some embodiments, the master logic unit is further configured to route an output of a first ADC of the ADCs to the FIFO memory, the FIFO memory storing the sensor samples from the first ADC when the output of the first ADC is coupled to the FIFO memory. In some embodiments, the gesture sensor device further includes a multiplexer coupled to the ADCs and the random number generator, the multiplexer configured to couple one of the random number generator or the ADCs to the FIFO memory in response to a selection command from the master logic unit. In some embodiments, the ADCs are configured to add a prefix to the sensor samples. In some embodiments, the random number generator is further configured to add a prefix to the random numeric sequence. In some embodiments, the random number generator is a linear feedback shift register (LFSR). In some embodiments, the random numeric sequence is an M-sequence, and the LFSR is configured to produce the M-sequence. In some embodiments, the LFSR has a characteristic polynomial that is a primitive polynomial. In some embodiments, the random numeric sequence has a first length, and the FIFO memory has a second length, the second length a multiple of the first length. In some embodiments, the master logic unit is a microcontroller.

Although this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A sensor system comprising:
   a gesture sensor device comprising:
   a random number generator configured to produce a predefined numeric sequence;
   a first-in-first-out (FIFO) memory coupled to the random number generator, the FIFO memory being configured to store a predetermined quantity of repetitions of the predefined numeric sequence; and
   a digital interface coupled to the FIFO memory, the digital interface being configured to transmit the repetitions of the predefined numeric sequence stored in the FIFO memory; and
   an application processor coupled to the gesture sensor device, the application processor configured to receive the repetitions of the predefined numeric sequence over the digital interface, to access a copy of the predefined numeric sequence, and to correlate the copy of the predefined numeric sequence with the repetitions of the predefined numeric sequence.

2. The sensor system of claim 1, wherein the gesture sensor device further comprises:
   radio frequency (RF) devices configured to transmit incident RF signals to a target, and receive reflected RF signals from the target indicating information regarding a gesture of the target in three-dimensional space.

3. The sensor system of claim 1, wherein the application processor is configured to adjust a parameter of the digital interface in response to the copy of the predefined numeric sequence not correlating with the repetitions of the predefined numeric sequence.

4. The sensor system of claim 1, wherein the gesture sensor device and the application processor are part of the same integrated circuit die.

5. A system comprising:
   an application processor configured to generate a verification command; and
   a gesture sensor device comprising:
   a random number generator configured to produce a random numeric sequence;
   a first-in-first-out (FIFO) memory, the FIFO memory configured to store a predefined quantity of repetitions of the random numeric sequence;
   a digital interface coupled to the FIFO memory and the application processor, the digital interface configured to transmit the repetitions of the random numeric sequence stored in the FIFO memory to the application processor; and
   a master logic unit configured to store the random numeric sequence from the random number generator to the FIFO memory in response to receiving the verification command from the application processor.

6. The system of claim 5, further comprising:
   radio frequency (RF) devices configured to transmit incident RF signals to a target, and receive reflected RF signals from the target indicating information regarding a gesture of the target in three-dimensional space; and
   analog-to-digital converters (ADCs) coupled to the RF devices, the ADCs converting the information regarding the gesture to sensor samples.

7. The system of claim 6, wherein the master logic unit is further configured to turn-off the RF devices in response to receiving the verification command from the application processor.

8. The system of claim 6, wherein the master logic unit is further configured to route an output of a first ADC of the ADCs to the FIFO memory, the FIFO memory storing the sensor samples from the first ADC when the output of the first ADC is coupled to the FIFO memory.

9. The system of claim 6, further comprising a multiplexer coupled to the ADCs and the random number generator, the multiplexer configured to couple one of the random number generator or the ADCs to the FIFO memory in response to a selection command from the master logic unit.

10. The system of claim 6, wherein the ADCs are configured to add a prefix to the sensor samples.

11. The system of claim 5, wherein the random number generator is further configured to add a prefix to the random numeric sequence.

12. The system of claim 5, wherein the random number generator is a linear feedback shift register (LFSR).

13. The system of claim 12, wherein the random numeric sequence is a maximum length sequence (M-sequence), and the LFSR is configured to produce the M-sequence.

14. The system of claim 12, wherein the LFSR has a characteristic polynomial that is a primitive polynomial.

15. The system of claim 5, wherein the random numeric sequence has a first length, and the FIFO memory has a second length, the second length a multiple of the first length.

16. The system of claim 5, wherein the master logic unit is a microcontroller.

17. The system of claim 5, wherein the application processor is configured to receive the repetitions of the random numeric sequence over the digital interface, to access a copy of a predefined numeric sequence, and to correlate the copy of the predefined numeric sequence with the repetitions of the random numeric sequence.

18. The system of claim 17, wherein the application processor is further configured to adjust a parameter of the digital interface in response to the copy of the predefined numeric sequence not correlating with the repetitions of the random numeric sequence.

19. The system of claim 18, wherein the digital interface is a serial peripheral interface (SPI) bus, and wherein the application processor is further configured to adjust the parameter of the digital interface by adjusting a SPI bus parameter of the gesture sensor device.

20. The system of claim 18, wherein the digital interface is a serial peripheral interface (SPI) bus, and wherein the application processor is further configured to adjust the parameter of the digital interface by adjusting a SPI bus parameter of the application processor.

21. The system of claim 17, wherein the application processor is configured to correlate the copy of the predefined numeric sequence with the repetitions of the random numeric sequence by correlating the repetitions of the random numeric sequence and the predefined numeric sequence with an autocorrelation function, by counting a quantity of peaks produced by the autocorrelation function, and by determining whether the quantity of peaks produced by the autocorrelation function equals the predefined quantity of repetitions of the random numeric sequence.

22. The system of claim 5, further comprising:
a radio frequency (RF) transmitter circuit configured to transmit incident RF signals to a target;
an RF receiver circuit configured to receive reflected RF signals from the target indicating information regarding a gesture of the target in three-dimensional space; and
analog-to-digital converters (ADCs) coupled to the RF receiver circuit, the ADCs converting the information regarding the gesture to sensor samples.

23. A sensor system comprising:
a gesture sensor device comprising:
    a random number generator configured to produce a predefined numeric sequence;
    a first-in-first-out (FIFO) memory coupled to the random number generator, the FIFO memory being configured to store a predetermined quantity of repetitions of the predefined numeric sequence; and
    a first digital interface coupled to the FIFO memory, the first digital interface being configured to transmit the repetitions of the predefined numeric sequence stored in the FIFO memory; and
a verification circuit comprising:
    a second digital interface coupled to the first digital interface of the gesture sensor device, the second digital interface configured to receive the repetitions of the predefined numeric sequence;
    a second memory configured to store the repetitions of the predefined numeric sequence received by the second digital interface;
    non-volatile storage configured to store a copy of the predefined numeric sequence;
    a digital signal processor configured to correlate the copy of the predefined numeric sequence stored in the second memory with the repetitions of the predefined numeric sequence stored in the non-volatile storage;
    a general purpose processor configured to adjust a parameter of the second digital interface in response to the copy of the predefined numeric sequence not correlating with the repetitions of the predefined numeric sequence; and
    a bus interconnecting the second digital interface, the second memory, the non-volatile storage, the digital signal processor, and the general purpose processor.

* * * * *